US012675135B2

(12) United States Patent
Kang

(10) Patent No.: US 12,675,135 B2
(45) Date of Patent: Jul. 7, 2026

(54) DISPLAY DEVICE

(71) Applicant: Samsung Display Co., LTD., Yongin-si (KR)

(72) Inventor: Su-Hyoung Kang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 320 days.

(21) Appl. No.: 18/240,561

(22) Filed: Aug. 31, 2023

(65) Prior Publication Data

US 2024/0160248 A1 May 16, 2024

(30) Foreign Application Priority Data

Oct. 24, 2022 (KR) ........................ 10-2022-0137533

(51) Int. Cl.
*G06F 1/16* (2006.01)
*H04M 1/02* (2006.01)

(52) U.S. Cl.
CPC .......... *G06F 1/1656* (2013.01); *G06F 1/1616* (2013.01); *G06F 1/1652* (2013.01); *H04M 1/0216* (2013.01); *H04M 1/0268* (2013.01); *Y10T 428/24* (2015.01); *Y10T 428/24942* (2015.01)

(58) Field of Classification Search
CPC .... G06F 1/1656; G06F 1/1616; G06F 1/1652; H04M 1/0216; H04M 1/0268; Y10T 428/24; Y10T 428/24942
See application file for complete search history.

(56) References Cited

U.S. PATENT DOCUMENTS 11,267,973 B2 * 3/2022 Amin ..................... G02B 1/115
2007/0048509 A1 * 3/2007 Yoneyama ........ B32B 17/10018 428/323

(Continued)

FOREIGN PATENT DOCUMENTS

EP 3633004 A1 * 4/2020 ................ C09J 7/38
KR 10-1778291 9/2017

(Continued)

OTHER PUBLICATIONS

[NPL-1] M. U. Arshad, D. Dutta, Y. Y. Sin, S. W. Hsiao, C. Y. Wu, B. K. Chang, L. Dai, C. Y. Su; "Multi-functionalized fluorinated graphene composite coating for achieving durable electronics: Ultralow corrosion rate and high electrical insulating passivation"; Carbon, 195 (2022), p. 141-153. (Year: 2022).*

(Continued)

*Primary Examiner* — Donald M Flores, Jr.
(74) *Attorney, Agent, or Firm* — Womble Bond Dickinson (US) LLP

(57) ABSTRACT

A display device includes a flexible window, a base film, a first refractive index layer, a second refractive index layer, and an alcohol barrier layer. The base film is on a surface of the flexible window. The first refractive index layer is on the base film and has a first refractive index. The second refractive index layer is on the first refractive index layer, has a second refractive index different from the first refractive index, and includes a hollow silica particle. The alcohol barrier layer is on the second refractive index layer and includes a hydrophobic inorganic material.

20 Claims, 4 Drawing Sheets

(56) References Cited

U.S. PATENT DOCUMENTS

| | | | | |
|---|---|---|---|---|
| 2014/0030494 | A1* | 1/2014 | Chan | B32B 17/06 428/688 |
| 2017/0139082 | A1* | 5/2017 | Takai | G02B 5/0231 |
| 2018/0149785 | A1* | 5/2018 | Lee | G02F 1/133528 |

FOREIGN PATENT DOCUMENTS

| | | | | |
|---|---|---|---|---|
| KR | 10-2019-0026005 | | 3/2019 | |
| WO | WO-2015102399 | A1 * | 7/2015 | G06F 1/1652 |

OTHER PUBLICATIONS

[NPL-2] Nam et al. (WO 2015/102399 A1); Jul. 9, 2015 (EPO machine translation to English). (Year: 2015).*

* cited by examiner

DISPLAY DEVICE

CROSS REFERENCE TO RELATED APPLICATION

This application claims priority to and the benefit of Korean Patent Application No. 10-2022-0137533, filed on Oct. 24, 2022 in the Korean Intellectual Property Office, the entire content of which is herein incorporated by reference.

BACKGROUND

1. Field

Aspects of embodiments of the present disclosure relate to a display device.

2. Description of the Related Art

A flexible display device capable of deforming into various shapes has recently been developed. Unlike flat panel display devices, the flexible display device may be folded, bent, or rolled, like paper. The flexible display device may be easy to carry and may improve user convenience.

A foldable display device among the flexible display devices has recently attracted attention. The foldable display device may be repeatedly folded and unfolded.

SUMMARY

According to an aspect of embodiments of the present disclosure, a foldable display device may include a flexible window having a flexible property and a protective layer. The protective layer may be disposed on the window, and may include a material having high hardness. Since the protective layer includes the material having high hardness, the protective layer may prevent or substantially prevent a deformation of the window by a user's touch.

According to an aspect of embodiments of the present disclosure, a display device having improved durability is provided.

According to one or more embodiments of the present disclosure, a display device includes a flexible window, a base film on a surface of the flexible window, a first refractive index layer on the base film and having a first refractive index, a second refractive index layer on the first refractive layer, having a second refractive index different from the first refractive index, and including a hollow silica particle, and an alcohol barrier layer on the second refractive layer and including a hydrophobic inorganic material.

In an embodiment, the first refractive index may be greater than the second refractive index.

In an embodiment, the alcohol barrier layer may include graphene.

In an embodiment, the alcohol barrier layer may have a single layer structure.

In an embodiment, the alcohol barrier layer may include graphene functionalized with fluorine groups.

In an embodiment, the alcohol barrier layer may include graphene oxide.

In an embodiment, the alcohol barrier layer may have a multi-layer structure.

In an embodiment, the alcohol barrier layer may include graphene functionalized with fluorine groups.

In an embodiment, the alcohol barrier layer may include graphene oxide.

In an embodiment, the display device may further include an anti-finger layer disposed on the alcohol barrier layer. The anti-finger layer may include a perfluoropolyether layer and a primer layer.

According to one or more embodiments of the present disclosure, a display device includes a flexible window, a base film on a surface of the flexible window, a first refractive index layer on the base film and having a first refractive index, a second refractive index layer on the first refractive index layer, having a second refractive index different from the first refractive index, and including a hollow silica particle, an alcohol barrier layer on the second refractive index layer and including a hydrophobic inorganic material, and an inorganic layer on the alcohol barrier layer.

In an embodiment, the first refractive index may be greater than the second refractive index.

In an embodiment, the alcohol barrier layer may include graphene.

In an embodiment, the alcohol barrier layer may have a single-layer structure.

In an embodiment, the alcohol barrier layer may include graphene functionalized with fluorine groups.

In an embodiment, the alcohol barrier layer may include graphene oxide.

In an embodiment, the alcohol barrier layer may have a multi-layer structure.

In an embodiment, the alcohol barrier layer may include graphene functionalized with fluorine groups.

In an embodiment, the alcohol barrier layer may include graphene oxide.

In an embodiment, the display device may further include an anti-finger layer on the inorganic layer. The anti-finger layer may include a perfluoropolyether layer and a primer layer.

The display device according to one or more embodiments of the present disclosure may include a flexible window, a base film disposed on a surface of the flexible window, a first refractive index layer disposed on the base film and having a first refractive index, a second refractive index layer disposed on the first refractive index layer, having a second refractive index different from the first refractive index, and including a hollow silica particle, and an alcohol barrier layer disposed on the second refractive index layer and including a hydrophobic inorganic material. Accordingly, the durability of the display device may be improved.

The display device according to another embodiment of the present disclosure may include a flexible window, a base film disposed on a surface of the flexible window, a first refractive index layer disposed on the base film and having a first refractive index, a second refractive index layer disposed on the first refractive index layer, having a second refractive index different from the first refractive index, and including a hollow silica particle, an alcohol barrier layer disposed on the second refractive layer and including a hydrophobic inorganic material, and an inorganic layer disposed on the alcohol barrier layer. Accordingly, the durability of the display device may be improved.

DETAILED DESCRIPTION

Figure 1:
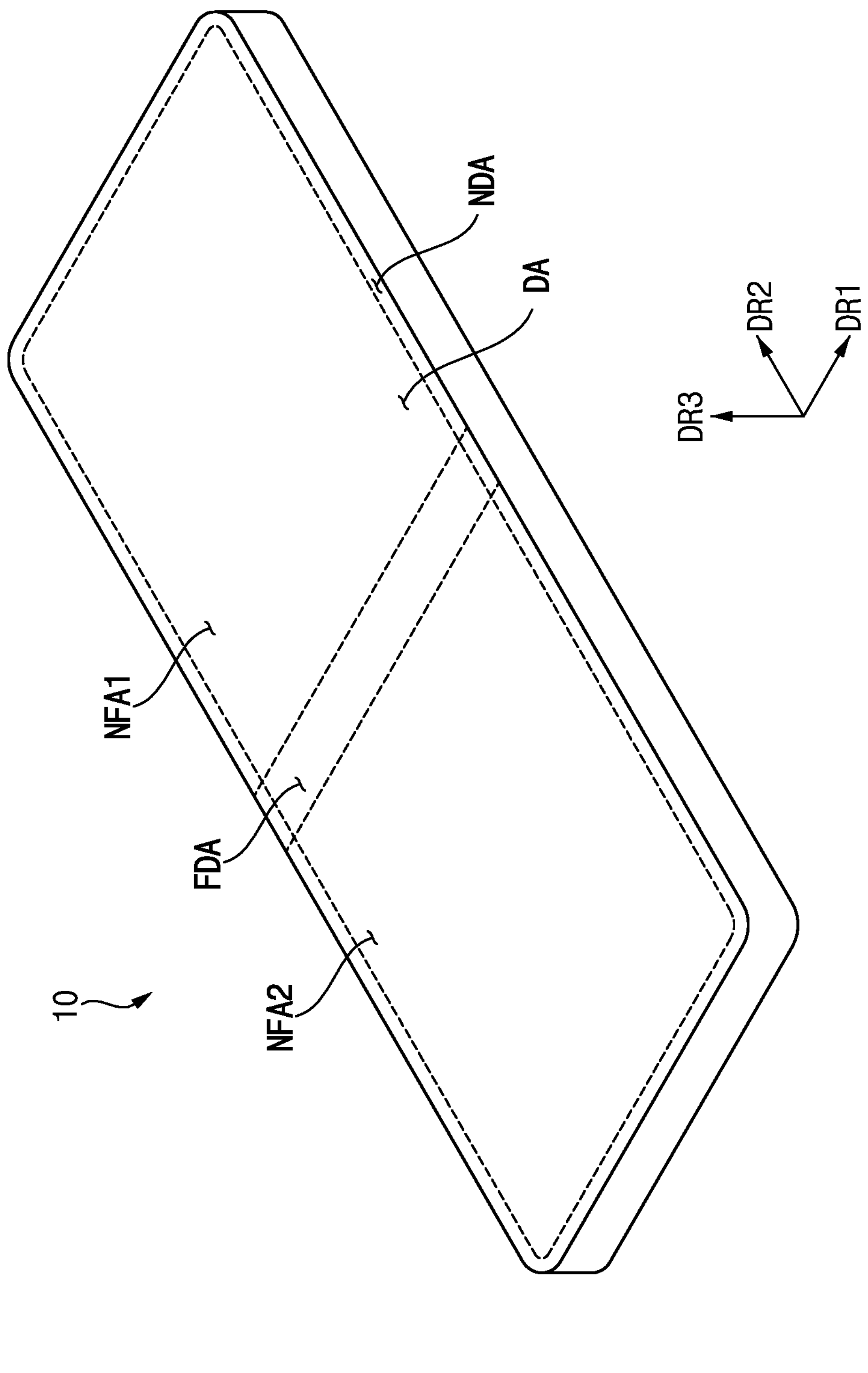
FIGS. 1 and 2 are perspective views illustrating a display device according to an embodiment of the present disclosure.

Herein, display devices in accordance with embodiments will be described in further detail with reference to the accompanying drawings. The same reference numerals are used for the same components in the drawings, and redundant descriptions of the same components will be omitted.

Figure 2:
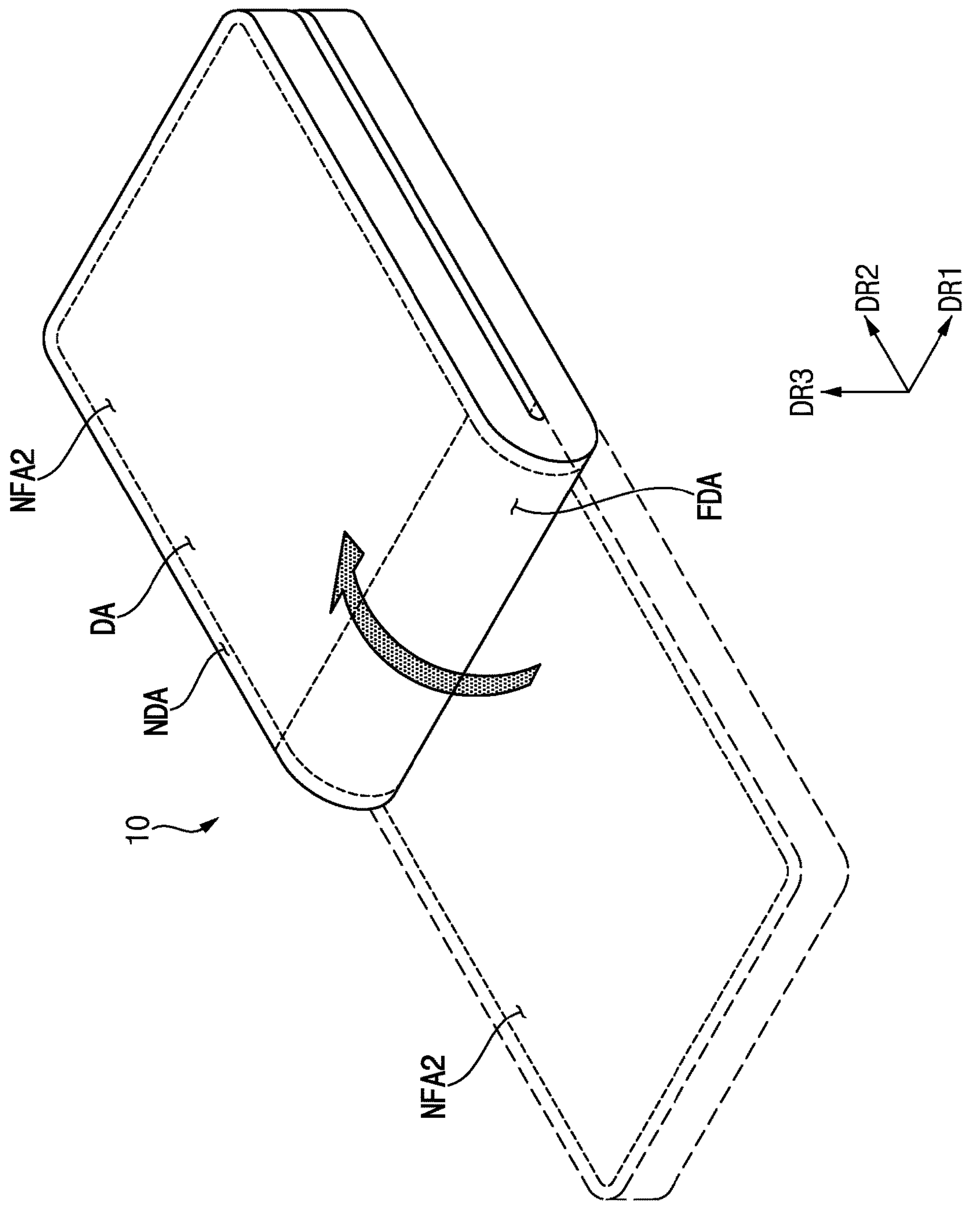

FIGS. 1 and 2 are perspective views illustrating a display device according to an embodiment of the present disclosure. FIG. 1 is a perspective view showing a display device 10 in an unfolded state, and FIG. 2 is a perspective view showing the display device 10 in a folded state.

Referring to FIGS. 1 and 2, the display device 10 may include a display area DA and a non-display area NDA.

The display area DA may be an area capable of displaying an image by generating light. A plurality of light emitting pixels may be disposed in the display area DA. Accordingly, the image may be displayed in the display area DA.

In an embodiment, the plurality of pixels may be arranged in a matrix form along a first direction DR1 and a second direction DR2. The second direction DR2 may intersect the first direction DR1. For example, the second direction DR2 may be perpendicular the first direction DR1. In this case, the image may be displayed in the display area DA in a third direction DR3. The third direction DR3 may be perpendicular to each of the first direction DR1 and the second direction DR2.

The non-display area NDA may be an area not displaying the image. In an embodiment, the non-display area NDA may surround at least a portion of the display area DA. For example, the non-display area NDA may entirely surround the display area DA.

The display device 10 may be a foldable display device. The display device may include a first unfolding area NFA1, a second unfolding area NFA2, and a folding area FDA according to whether the display device 10 is folded. The first unfolding area NFA1 and the second unfolding area NFA2 may be spaced apart from each other. The folding area FDA may be positioned between the first unfolding area NFA1 and the second unfolding area NFA2.

The folding area FDA may be an area where the display device 10 is folded. Each of the first unfolding area NFA1 and the second unfolding area NFA2 may be an area where the display device 10 is unfolded. The display device 10 may be folded such that the first unfolding area NFA1 and the second unfolding area NFA2 face each other based on the folding area FDA. The folding area FDA may be folded having a curvature.

In an embodiment, as illustrated in FIGS. 1 and 2, the display device 10 may include one folding area FDA and may be folded once. But, the present disclosure is not limited thereto. For example, the display device 10 may include two or more folding areas. In this case, the display device 10 may be folded twice or more.

In addition, in FIGS. 1 and 2, the folding area FDA may extend in the first direction DR1, and the display device 10 may be folded in the second direction DR2. However, the present disclosure is not limited thereto. For example, the folding area FDA may extend along the second direction DR2, and the display device 10 may be folded in the first direction DR1.

Figure 3:
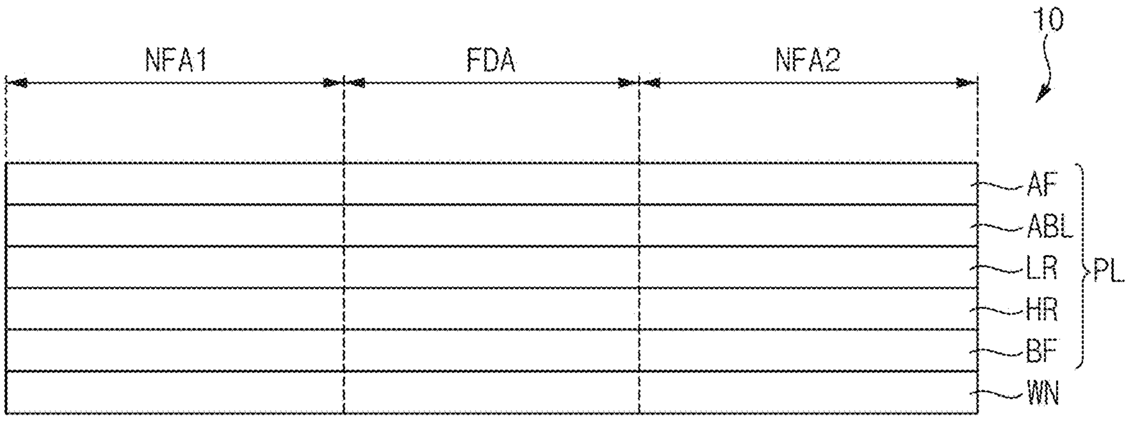
FIG. 3 is a cross-sectional view illustrating an embodiment of the display device of FIG. 1.

FIG. 3 is a cross-sectional view illustrating an embodiment of the display device of FIG. 1.

Referring to FIGS. 1, 2, and 3, when the display device 10 is the foldable display device, the display device 10 may include a flexible window WN and a protective layer PL.

The flexible window WN may have a flexible property. That is, the flexible window WN may be bent, folded, or rolled. The flexible window WN may include at least one folding area (i.e. the folding area FDA of FIG. 1).

The flexible window WN may include a material capable of being bent, folded, or rolled. For example, the flexible window WN may include a glass, a plastic, or the like.

The protective layer PL may be disposed on a surface of the flexible window WN, and may protect the flexible window WN. Herein, the protective layer PL will be described in further detail.

In an embodiment, the protective layer PL may include a base film BF, a first refractive index layer (a high refractive index layer) HR, a second refractive index layer (a low refractive index layer) LR, an alcohol barrier layer ABL, and an anti-finger layer AF.

The base film BF may be disposed on the flexible window WN.

The base film BF may include a polymer material. For example, the polymer material may include polyimide (PI), polyethylene terephthalate (PET), polyethylene naphthalate (PEN), polyethylene sulfide (PES), polyethylene (PE), polyamide (PA), polyether block amide (PEBA), and the like. These may be used alone or in combination with each other.

In an embodiment, a modulus of the base film BF may be about 200 MPa or more. When the modulus of the base film BF is less than about 200 MPa, air bubbles may exist between the flexible window WN and the base film BF. Accordingly, an adhesive force between the base film BF and the flexible window WN may be reduced.

However, the present disclosure is not limited thereto. For example, the base film BF may include various polymer materials, and each of the various polymer materials may have various modulus values in consideration of an adhesion to the flexible window WN.

The first refractive index layer HR and the second refractive index layer LR may be disposed on the base film BF. For example, the first refractive index layer HR may be disposed on the base film BF, and the second refractive index layer LR may be disposed on the first refractive index layer HR. In another embodiment, the first refractive index layer HR and the second refractive index layer LR may be alternately disposed as a plurality of layers on the base film BF.

The first refractive index layer HR and the second refractive index layer LR may include materials having different refractive indices to adjust reflectance. The first refractive index layer HR may include a material having a first refractive index, and the second refractive index layer LR may include a material having a second refractive index. In an embodiment, the first refractive index may be greater than the second refractive index.

In an embodiment, the first refractive index layer HR may include an oxide having a refractive index of about 1.67 to about 1.7. For example, the oxide may include any of tin oxide (SnOx), titanium oxide (TiOx), zirconium oxide (ZrOx), and the like.

In an embodiment, the second refractive index layer LR may include an oxide having a refractive index of about 1.42 to about 1.5. For example, the oxide may include hollow silica particles and the like. The hollow silica particles may mean silica particles filled with air inside, similar to a table tennis ball.

In an embodiment, a thickness of the first refractive index layer HR may be about 3000 nm to about 5000 nm. In an embodiment, a thickness of the second refractive index layer LR may be about 50 nm to about 90 nm. If the thickness of the first refractive index layer HR and the second refractive index layer LR are outside of the above-described thickness ranges, an adjusting effect of the reflectance may be decreased.

However, the present disclosure is not limited thereto. For example, each of the first refractive index layer HR and the second refractive index layer LR may include various oxides and may have various thicknesses in consideration of the reflectance.

The alcohol barrier layer ABL may be disposed on the second refractive index layer LR.

The alcohol barrier layer ABL may include a hydrophobic material. In an embodiment, since the alcohol barrier layer ABL includes the hydrophobic material, the alcohol barrier layer ABL may prevent or substantially prevent contaminants (e.g., alcohol, etc.) from penetrating into the second refractive index layer LR.

In an embodiment, the alcohol barrier layer ABL may include graphene or graphite. In an embodiment, the graphene may have a single-layer structure. In another embodiment, the graphene or the graphite may have a multi-layer structure.

In another embodiment, the alcohol barrier layer ABL may include graphene oxide or graphite oxide. In an embodiment, the graphene oxide may have the single-layer structure. In another embodiment, the graphene oxide or the graphite oxide may have the multi-layer structure.

In another embodiment, the alcohol barrier layer ABL may include graphene including a functional group (herein referred to as "functionalized graphene") or graphite containing a functional group (herein referred to as "functionalized graphite").

For example, the alcohol barrier layer ABL may include graphene functionalized with fluorine (F) groups (fluorographene) or graphite fluoride functionalized with fluorine (F) groups (graphite fluoride). In an embodiment, the functionalized graphene may have the single-layer structure. In another embodiment, the functionalized graphene or the functionalized graphite may have the multi-layer structure.

The functionalized graphene or the functionalized graphite may have any of various molecular structures. For example, the fluorographene may include a CFx structure. The CFx structure may be any of a chair form, a boat form, and the like.

The functional group may include one or more fluorine (F) atoms. For example, the functionalized graphene or the functionalized graphite may be a form in which the fluorine group is substituted for the graphene or the graphite. In another embodiment, the functionalized graphene or the functionalized graphite may be a form in which a fluorinated moiety is bonded to the graphene or the graphite.

For example, the alcohol barrier layer ABL may include fluorinated graphene oxide-silica nanohybrid (GOSF). The fluorinated graphene oxide-silica nanohybrid (GOSF) may be formed in the following order.

First, graphene oxide (GO) may be obtained by a graphene oxide synthesis method (Hummers modified method). For example, the graphene oxide may be obtained by oxidizing the graphite with sulfuric acid and/or phosphoric acid ($H_2SO_4$, $H_2PO_4$). The graphene oxide may be represented as the following.

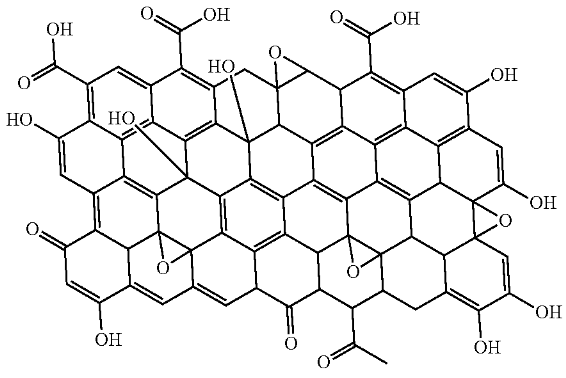

Next, graphene oxide-silica nanohybrid (GOS) may be obtained by acid-catalyzed Fischer esterification. For example, a silicon hydroxide (SiOH) functional group may be obtained through a condensation reaction with silicon dioxide/water ($SiO_2/H_2O$) at an end of the graphene oxide GO. The graphene oxide-silica nanohybrid (GOS) may be represented as the following.

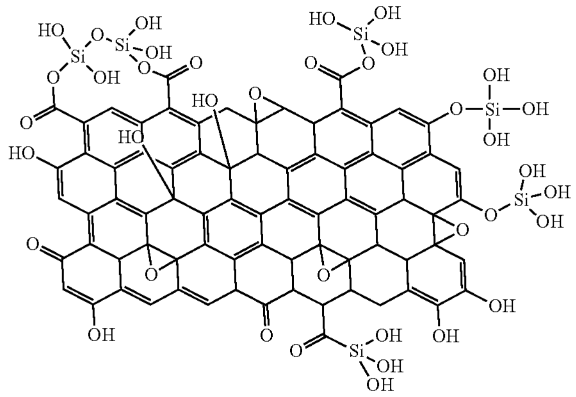 [SMILES: O=C1C=C(O)C2=CC3=CC4C(=O)C5C(C(=O)[Si](O)(O)O)C6CC7=C(O)C(O)=CC89OC8%10C(O[Si](O)(O)O)=Cc8c(O[Si](O)(O)O)cc%11c%12c8C%10C8=c%10c%13c%14c%15c(c%10=%12)C(C=%11C(=O)O[Si](O)(O)O)C%10OC%10%11Cc%10c%12c%16c%17c%18cc(c%19c(O)cc%20c(c%19%17)=C%17C%19(OC3%19c3c4c(c-%14c(c3[C@]%17%16O)[C@@]%12(O)C%15%11)C5C%133OC63C8C79)C2C=%201)C(=O)O[Si](O)(O)O[Si](O)(O)OC(=O)c%10%18]

Next, the fluorinated moiety (3-pentadecafluoroheptyl, 5-perfluorophenyl-1,2,4-oxadiazole) and a characterized graphene oxide-silica nanohybrid (GOS) may be covalently bonded. Through this, the fluorinated graphene oxide-silica nanohybrid (GOSF) may be made. The graphene oxide-silica nanohybrid (GOS) may undergo nucleophilic substitution by hydroxyl functionalities. Each of the fluorinated moiety and the fluorinated graphene oxide-silica nanohybrid (GOSF) may be represented as shown in either of the following.

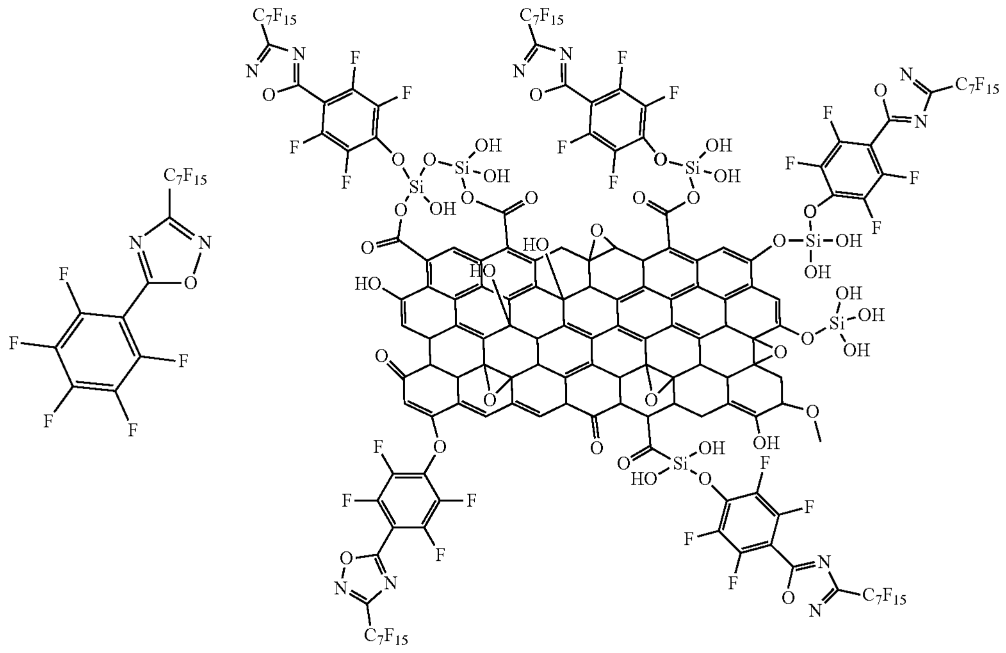

However, the present disclosure is not limited thereto. For example, the alcohol barrier layer ABL may include various hydrophobic materials and may have various structures.

The anti-finger layer AF may be disposed on the alcohol barrier layer ABL.

The anti-finger layer AF may have a property capable of preventing or substantially preventing and removing contaminants, such as fingerprints (e.g., an antifouling property).

In an embodiment, the anti-finger layer AF may include a perfluoropolyether (PFPE) and a primer.

In an embodiment, a molecular weight of the perfluoropolyether (PFPE) may be less than about 2000. In an embodiment, a molecular weight of an anchoring group of the perfluoropolyether (PFPE) may be less than about 1000. An end of the anchoring group of the perfluoropolyether (PFPE) may include an amine group, an epoxy group, a vinyl group, or the like. In an embodiment, a thickness of the anti-finger layer AF may be about 100 nm or less.

The primer may be defined as a coating layer. The primer may be the coating layer to improve an adhesion of the perfluoropolyether. For example, the primer may include a silicone (Si).

However, the present disclosure is not limited thereto. For example, the anti-finger layer AF may further include any of various materials capable of improving water repellency, oil repellency, and antifouling properties. In addition, the thickness of the anti-finger layer AF may be varied in consideration of a surface state of the display device 10.

In the above description, the protective layer PL disposed on the surface of the flexible window WN with the alcohol barrier layer ABL has been mainly described, but the present invention is not limited thereto. For example, the display device 10 may further include a cover film including a cushion, an adhesive layer, and the like. That is, the protective layer PL may be disposed on the surface of the flexible window WN, and the cover film or the like may be further disposed on another surface of the flexible window WN. In an embodiment, a first adhesive layer may be further disposed between the flexible window WN and the protective layer PL, and a second adhesive layer may be further disposed between the flexible window WN and the cover film.

Durability of the protective layer PL may be deteriorated while the display device is in use. For example, if a finger repeatedly touches the protective layer PL, the finger repeatedly slides on the protective layer PL, or repeatedly wipes dust adhering to the protective layer PL with a cloth, the durability of the protective layer PL may be deteriorated. Meanwhile, when the protective layer PL is wiped with a chemical, durability of the protective layer PL may be further deteriorated. However, in the display device according to embodiments of the present disclosure, the durability of the display device may be improved by including the alcohol barrier layer ABL. To confirm this, abrasion resistance and chemical resistance tests were performed on a surface of the protective layer PL as follows.

Test Order

Droplets (e.g., water droplets) were dropped on a measurement surface of a target sample (i.e., the surface of the protective layer PL), and measurement results were analyzed according to a droplet method (interpretation method: $\theta/2$) using a contact angle meter.

Target Sample

The protective layer according to a comparative example was formed by sequentially stacking the base film BF, the first refractive index layer HR, the second refractive index layer LR, and the anti-finger layer AF.

The protective layer PL according to an embodiment of the present disclosure was formed by sequentially stacking the base film BF, the first refractive index layer HR, the second refractive index layer LR, the alcohol barrier layer ABL, and the anti-finger layer AF.

That is, the embodiment of the present disclosure is different from the comparative example in that the alcohol barrier layer ABL is further included between the second refractive index layer LR and the anti-finger layer AF.

Abrasion Resistance Test

First, rubbing test sticks were installed on each surface of the protective layer according to the comparative example and the protective layer PL according to the embodiment of the present disclosure so as to be spaced apart from each other. Next, the surface of the target sample was cut with a cutter. Next, a load of about 1000 g was applied while the rubbing test stick was in contact with the surface of the target sample. Thereafter, the rubbing test stick was reciprocally moved at a speed of about 40 rotations per minute (rpm) for a moving distance of about 20 mm, and then the contact angle was measured.

Chemical Resistance Test

Ethanol was dropped on the surface of the target sample. About 1 cc of the ethanol was dropped every time the rubbing test stick reciprocated about 500 times. The same procedure as in the abrasion resistance test was performed except that the ethanol was dropped.

Test Result

If the contact angle of the droplet is less than about 95 degrees after the rubbing test stick is reciprocated more than about 1500 times, alcohol penetration may not be prevented. Herein, "OK" was indicated when the contact angle with respect to the droplet was greater than or equal to about 95 degrees, and "NG" was indicated when the contact angle with respect to the droplet was less than about 95 degrees. The abrasion resistance and the chemical resistance test results are shown in Table 1 below.

TABLE 1

| | the comparative example | the embodiment of the present disclosure |
|---|---|---|
| abrasion resistance | 2K (NG) | 4K (OK) |
| chemical resistance | 0.5K (NG) | 2~3K (OK) |

Referring to Table 1, performance of the comparative example had about 2K (i.e. about 2000) as a result of the abrasion resistance test, and about 0.5K (i.e. about 500) as a result of the chemical resistance test was confirmed. On the other hand, performance of the embodiment of the disclosure had about 4K (i.e., about 4000) as a result of the abrasion resistance test, and about 2K (i.e. about 2000) to about 3K (i.e. about 3000) as a result of the chemical resistance test was confirmed.

In summary, the protective layer PL according to the embodiment of the present disclosure may further include the alcohol barrier layer ABL between the second refractive index layer LR and the anti-finger layer AF. The alcohol barrier layer ABL may include the hydrophobic material to prevent or substantially prevent penetrating of alcohol, moisture, gas, or the like. Accordingly, the alcohol barrier layer ABL may improve the durability of the display device according to the embodiment of the present disclosure.

Figure 4:
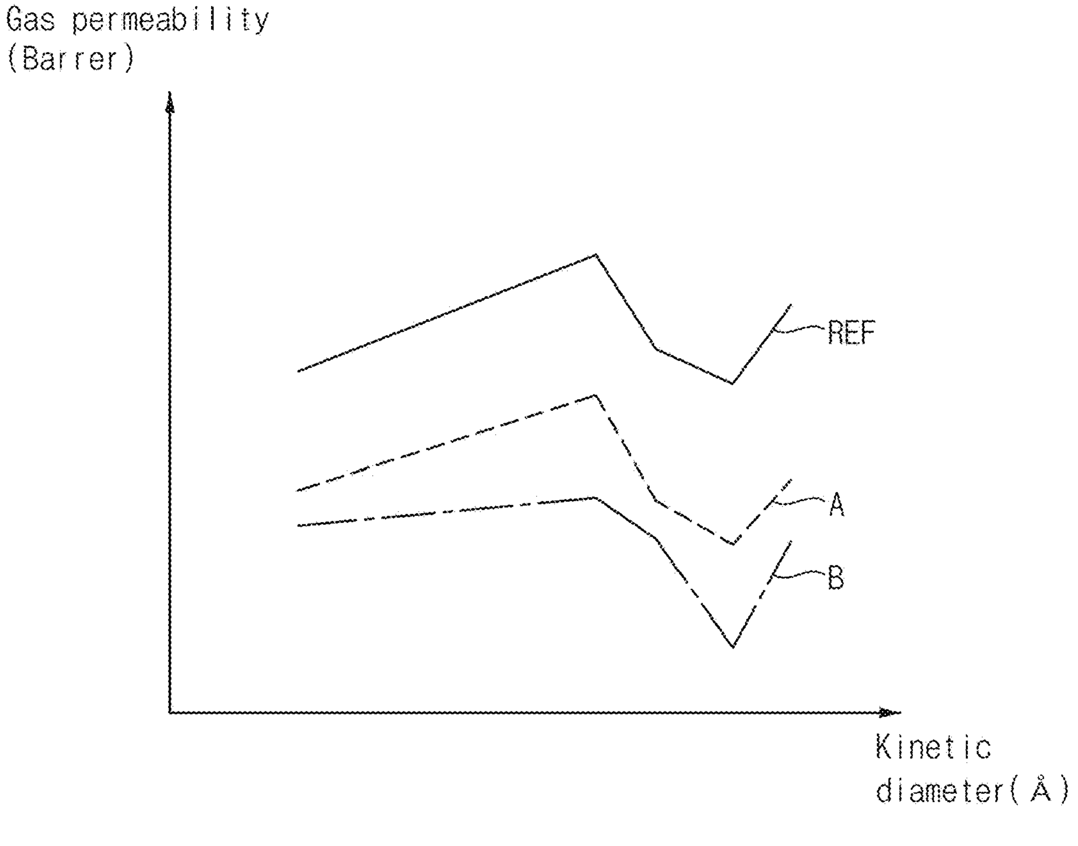
FIG. 4 is a diagram illustrating the durability of the display device of FIG. 3.

FIG. 4 is a diagram illustrating the durability of the display device of FIG. 3. A horizontal axis of FIG. 4 represents a kinetic diameter (unit: Å), and a vertical axis represents gas permeability (unit: barrer).

Referring to FIG. 4, a gas permeability of a first display device A is smaller than a gas permeability of a comparative example REF. In other words, a gas permeation prevention effect of the first display device A is greater than a gas permeation prevention effect of the comparative example REF.

The display device according to the comparative example was formed by sequentially stacking the base film BF, the first refractive index layer HR, the second refractive index layer LR, and the anti-finger layer AF on the flexible window WN.

The first display device A was formed by sequentially stacking the base film BF, the first refractive index layer HR, the second refractive index layer LR, the alcohol barrier layer ABL, and the anti-finger layer AF on the flexible window WN.

That is, the first display device A may be different from the comparative example in that the alcohol barrier layer ABL may be further included between the second refractive index layer LR and the anti-finger layer AF.

In summary, unlike the comparative example, the first display device A may further include the alcohol barrier layer ABL between the second refractive index layer LR and the anti-finger layer AF. The alcohol barrier layer ABL may include the hydrophobic material to prevent or substantially prevent penetrating of alcohol, moisture, gas, or the like. Accordingly, the gas permeation prevention effect of the first display device A may be greater than the gas permeation prevention effect of the display device according to the comparative example over the entire moving diameter.

Figure 5:
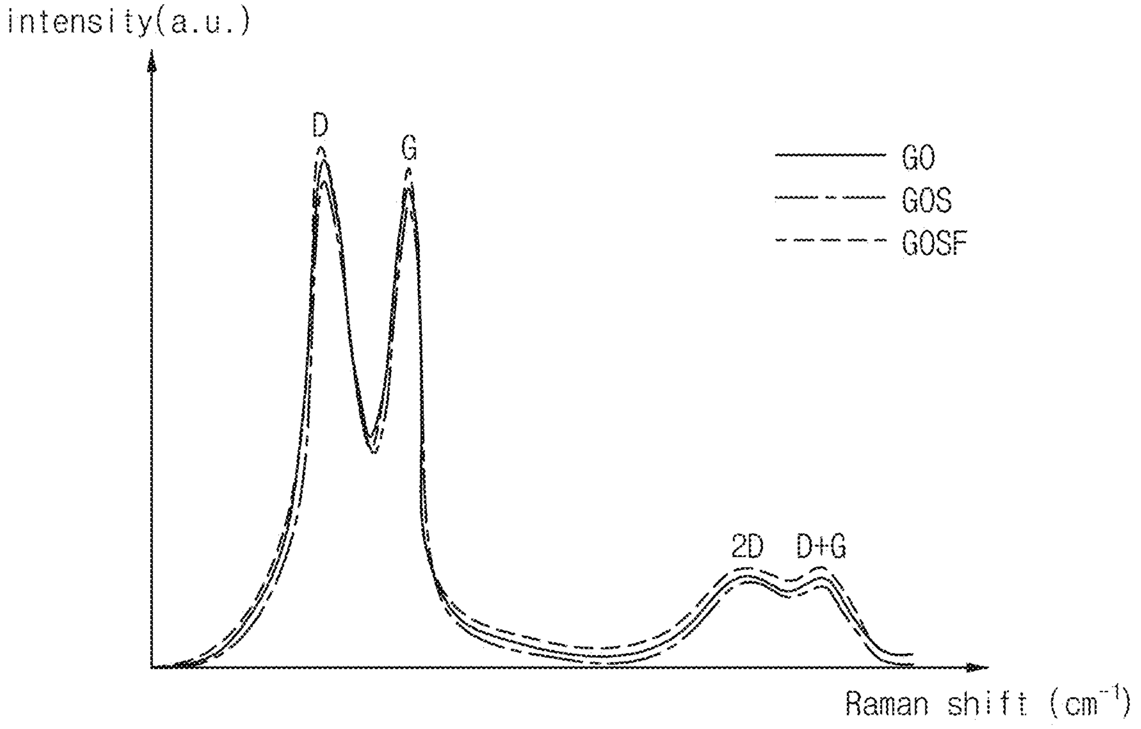
FIG. 5 is a diagram illustrating a result of analyzing materials included in an alcohol barrier layer of the display device of FIG. 3.

FIG. 5 is a diagram illustrating a result of analyzing materials included in the alcohol barrier layer of FIG. 3. A horizontal axis of FIG. 5 represents Raman shift (Unit: $cm^{-1}$), and a vertical axis represents intensity (Unit: a.u.).

Referring to FIGS. 3 and 5, the materials included in the alcohol barrier layer ABL may be confirmed by using Raman spectroscopy. The alcohol barrier layer ABL may include the hydrophobic material. The hydrophobic material may include the graphene, the graphite, the graphene oxide (GO), the graphite oxide, the fluorographene, the graphite fluoride, the graphene oxide-silica nanohybrid (GOS), the fluorinated graphene oxide-silica nanohybrid (GOSF), and the like may be included.

The graphene and the like included in the display device 10 may be confirmed by Raman spectrum. Specifically, the graphene and the like may be confirmed by D peak, G peak, and intensity ratio of the D and G peaks ($I_{D/G}$) of the Raman spectrum.

When the graphene oxide (GO) is included in the alcohol barrier layer ABL, the intensity ratio (of the D and G peaks) may be about 2. When the graphene oxide-silica nanohybrid (GOS) is included in the alcohol barrier layer ABL, the intensity ratio (of the D and G peaks) may be about 1.91. When the fluorinated graphene oxide-silica nanohybrid (GOSF) is included in the alcohol barrier layer ABL, the intensity ratio (of the D and G peaks) may be about 1.94. Through this, whether the display device includes the alcohol barrier layer ABL including the graphene or the like may be confirmed.

Figure 6:
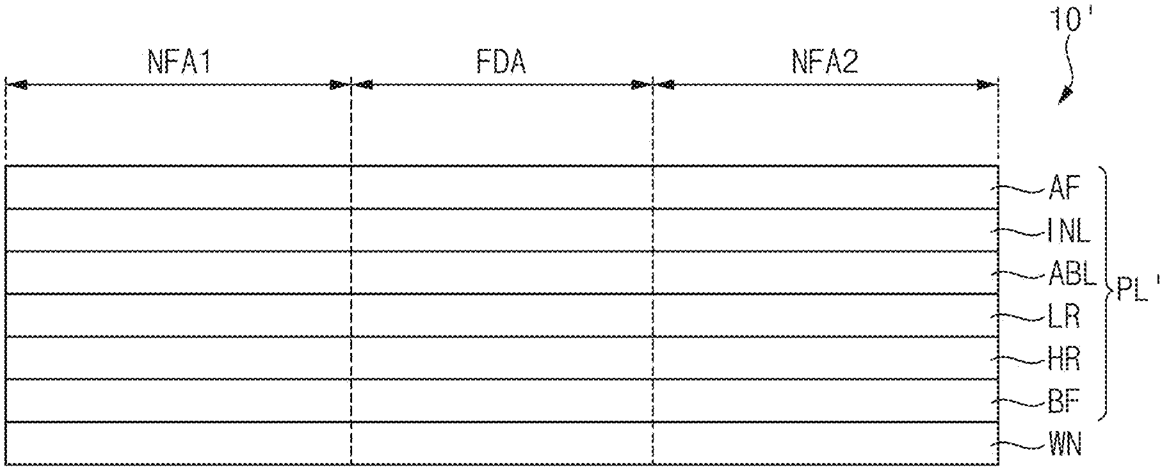
FIG. 6 is a cross-sectional view illustrating another embodiment of the display device of FIG. 1.

FIG. 6 is a cross-sectional view illustrating another embodiment of the display device of FIG. 1.

Referring to FIG. 6, a display device 10' may include the flexible window WN and a protective layer PL'. A description of the display device 10' may overlap with that of the display device 10 described above with reference to FIGS. 1 to 6. Therefore, redundant descriptions may be omitted or simplified below.

The flexible window WN may have the flexible property. That is, the flexible window WN may be bent, folded, or rolled. The flexible window WN may include at least one folding area (e.g., the folding area FDA of FIG. 1).

The flexible window WN may include the material capable of being bent, folded, or rolled. For example, the flexible window WN may include the glass, the plastic, or the like.

The protective layer PL' may be disposed on a surface of the flexible window WN, and may protect the flexible window WN. Herein, the protective layer PL' will be described in further detail.

The protective layer PL' may include the base film BF, the first refractive index layer HR, the second refractive index layer LR, the alcohol barrier layer ABL, an inorganic layer INL, and the anti-finger layer AF.

The base film may be disposed on the flexible window WN.

The base film BF may include the various polymer materials, and each of the various polymer materials may have the various modulus values in consideration of an adhesion to the flexible window WN.

The first refractive index layer HR and the second refractive index layer LR may be disposed on the base film BF.

Each of the first refractive index layer HR and the second refractive index layer LR may include various oxides and may have various thicknesses in consideration of the reflectance.

The alcohol barrier layer ABL may be disposed on the second refractive index layer LR.

The alcohol barrier layer ABL may include various hydrophobic materials and may have various structures. In an embodiment, the alcohol barrier layer ABL may include the graphene, the graphite, and the graphene oxide (GO), the graphite oxide, the fluorographene, the graphite fluoride, the graphene oxide-silica nanohybrid (GOS), the fluorinated graphene oxide-silica nanohybrid (GOSF), and the like.

The inorganic layer INL may be disposed on the alcohol barrier layer ABL.

The inorganic layer INL may include a hydrophobic inorganic material. In an embodiment, the inorganic layer INL may include aluminum oxide (AlOx).

The inorganic layer INL may be formed by sputtering, physical vapor deposition (PVD), chemical vapor deposition (CVD), atomic layer deposition (ALD), or the like. In an embodiment, the inorganic layer INL may be formed by the atomic layer deposition (ALD) method.

By forming the aluminum oxide (AlOx) by the atomic layer deposition method, the inorganic layer INL may be denser. As the inorganic layer INL becomes denser, chemical resistance performance may be further improved. Through this, the durability of the display device 10' may be further improved.

However, the present disclosure is not limited thereto. For example, the inorganic layer INL may include various inorganic materials, and any method of forming the inorganic layer INL may be used without limitation as long as the method may form the dense layer.

The anti-finger layer AF may be disposed on the alcohol barrier layer ABL. The anti-finger layer AF may further include various materials capable of improving the water repellency, the oil repellency, and the antifouling properties. In addition, the thickness of the anti-finger layer AF may be varied in consideration of a surface state of the display device 10'.

As described above with reference to Table 1, the durability of the display device 10 according to an embodiment of the present disclosure may be improved. The performance of the comparative example showed less than about 2K. On the other hand, the embodiment of the present disclosure further included the alcohol barrier layer ABL. And, the performance of the embodiment of the present disclosure had about 2K or more as the result of the abrasion resistance test.

The display device 10' according to another embodiment of the present disclosure may further include the inorganic layer INL. Accordingly, the durability of the display device 10' may be further improved.

As described above with reference to FIG. 4, the gas permeability of the first display device A is smaller than the gas permeability of the comparative example REF. In other words, the gas permeation prevention effect of the first display device A is greater than the gas permeation prevention effect of the comparative example REF. A gas permeation prevention effect of a second display device B is smaller than the gas permeation prevention effect of the first display device A. In other words, the gas permeation prevention effect of the second display device B is greater than the gas permeation prevention effect of the first display device A.

The display device according to the comparative example was formed by sequentially stacking the base film BF, the first refractive index layer HR, the second refractive index layer LR, and the anti-finger layer AF on the flexible window WN.

The first display device A was formed by sequentially stacking the base film BF, the first refractive index layer HR, the second refractive index layer LR, the alcohol barrier layer ABL, and the anti-finger layer AF on the flexible window WN.

That is, the first display device A is different from the comparative example in that the alcohol barrier layer ABL is further included between the second refractive index layer LR and the anti-finger layer AF.

The second display device B was formed by sequentially stacking the base film BF, the first refractive index layer HR, the second refractive index layer LR, the alcohol barrier layer ABL, the inorganic layer INL, and the anti-finger layer AF on the flexible window WN.

That is, the second display device B is different from the comparative example in that the alcohol barrier layer ABL and the inorganic layer INL are further included between the second refractive index layer LR and the anti-finger layer AF.

In summary, unlike the comparative example, the second display device B may further include the alcohol barrier layer ABL and the inorganic layer INL between the second refractive index layer LR and the anti-finger layer AF. The alcohol barrier layer ABL may include the hydrophobic material to prevent or substantially prevent penetrating of alcohol, moisture, gas, or the like. The inorganic layer INL may be formed by the atomic layer deposition (ALD) method. Accordingly, the gas permeation prevention effect of the second display device B may be greater than the gas permeation prevention effect of each of the display device according to the comparative example and the first display device A over the entire moving diameter.

The present invention should not be construed as being limited to the embodiments set forth herein. Rather, these embodiments are provided so that this disclosure will be thorough and complete and will fully convey the concept of the invention to those skilled in the art While the invention has been particularly shown and described with reference to some embodiments thereof, it will be understood by those of ordinary skill in the art that various changes in form and details may be made therein without departing from the spirit or scope of the invention as set forth in the following claims.

Embodiments of the present disclosure may be applied to a display device and a method of manufacturing the same. The display device may be included, for example, in a computer, a laptop computer, a mobile phone, a smartphone, a smart pad, a PMP, a PDA, an MP3 player, and the like.

What is claimed is:

1. A display device comprising:

a flexible window;

a base film on a surface of the flexible window;

a first refractive index layer on the base film and having a first refractive index;

a second refractive index layer on the first refractive index layer, having a second refractive index different from the first refractive index, and comprising a hollow silica particle; and an alcohol barrier layer on the second refractive index layer and comprising a hydrophobic inorganic material, wherein a thickness of the first refractive index layer is about 3000 nm to about 5000 nm, and a thickness of the second refractive index layer is about 50 nm to about 90 nm.

2. The display device of claim 1, wherein the first refractive index is greater than the second refractive index.

3. The display device of claim 1, wherein the hydrophobic inorganic material comprises graphene.

4. The display device of claim 3, wherein the alcohol barrier layer has a single-layer structure.

5. The display device of claim 4, wherein the graphene comprises graphene functionalized with fluorine groups.

6. The display device of claim 4, wherein the graphene comprises graphene oxide.

7. The display device of claim 3, wherein the alcohol barrier layer has a multi-layer structure.

8. The display device of claim 7, wherein the graphene comprises graphene oxide.

9. The display device of claim 1, further comprising:

an anti-finger layer on the alcohol barrier layer, wherein the anti-finger layer comprises a perfluoropolyether and a primer.

10. A display device comprising:

a flexible window;

base film on a surface of the flexible window;

a first refractive index layer on the base film and having a first refractive index;

a second refractive index layer on the first refractive index layer, having a second refractive index different from the first refractive index, and comprising a hollow silica particle; and an alcohol barrier layer on the second refractive index layer and comprising a hydrophobic inorganic material, wherein the hydrophobic inorganic material comprises graphene, wherein the alcohol barrier layer has a multi-layer structure, and wherein the graphene comprises graphene functionalized with fluorine groups.

11. A display device comprising:

a flexible window;

a base film on a surface of the flexible window;

a first refractive index layer on the base film and having a first refractive index;

a second refractive index layer on the first refractive index layer, having a second refractive index different from the first refractive index, and comprising a hollow silica particle;

an alcohol barrier layer on the second refractive index layer and comprising a hydrophobic inorganic material; and an inorganic layer on the alcohol barrier layer, wherein a thickness of the first refractive index layer is about 3000 nm to about 5000 nm, and a thickness of the second refractive index layer is about 50 nm to about 90 nm.

12. The display device of claim 11, wherein the first refractive index is greater than the second refractive index.

13. The display device of claim 11, wherein the hydrophobic inorganic material comprises graphene.

14. The display device of claim 13, wherein the alcohol barrier layer has a single-layer structure.

15. The display device of claim 14, wherein the graphene comprises graphene functionalized with fluorine groups.

16. The display device of claim 14, wherein the graphene comprises graphene oxide.

17. The display device of claim 13, wherein the alcohol barrier layer has a multi-layer structure.

18. The display device of claim 17, wherein the graphene comprises graphene functionalized with fluorine groups.

19. The display device of claim 17, wherein the graphene comprises graphene oxide.

20. The display device of claim 11, further comprising:

an anti-finger layer on the inorganic layer, wherein the anti-finger layer comprises a perfluoropolyether and a primer.

* * * * *